UNITED STATES PATENT OFFICE 2,631,097

METHOD OF PRODUCING CELLULOSE MASS AND PRODUCT

Donald V. Redfern, Seattle, Wash., assignor to American-Marietta Company, Adhesive, Resin and Chemical Division, Seattle, Wash., a corporation of Illinois No Drawing. Application November 4, 1948, Serial No. 58,372

20 Claims. (Cl. 92—21)

The present invention relates to the production of fiber products such as paper webs, softboards, hardboards, wallboards, bonded wooden members, plywood and the like, said products being produced by bonding or impregnating of the fiber products with a thermosetting phenol reaction-product of an initial condensation product of an aldehyde in which the aldehyde group is the sole reactive group, and a phenol selected from the group consisting of monohydric phenols having a distillation range between 175° C. and 225° C. inclusive, and an alkaline catalyst, as for example, an alkali hydroxide or carbonate accelerating the formation of the initial resin reaction-product on heating, said catalyst being present in an amount not over 10% taken on the weight of the phenol, the molar ratio of the aldehyde to the phenol varying from 1:1 to 3:1, or alternately in the ratio of 1:1 to 1.5:1, said thermosetting reaction-product resulting from the stepwise additions of alkali metal hydroxide to the initial phenol-aldehyde reaction product with a heat condensation step between each alkaline addition of alkali metal hydroxide, said resin which is the alkaline salt of the phenol-aldehyde condensation product and which is water-soluble being well advanced toward its insoluble and infusible C-stage state, but retaining its thermosetting characteristics. Each heat condensation step may be carried out at or near reflux temperature, that is between 90° C. and 105° C., although the temperature of heating and condensation may be less, as for example 75° C. or 80° C.

An aqueous solution of the resin after each addition of the alkali metal hydroxide and each heating and condensing step becomes viscous, said increase in viscosity being indicative of the advancement of the water-soluble phenol-aldehyde reaction-product to the stage where the water-soluble state terminates. After each addition of each increment of alkaline material, alkali metal hydroxide, there is a reduction in the viscosity of the water-soluble reaction-product. This addition of alkali permits a further condensation of the phenol-aldehyde resin condensation product without conversion of the latter to a water-insoluble stage. These additions of the alkaline material, alkali metal hydroxide, may be terminated while the resin reaction-product is in a water-soluble stage and the aqueous solution of the alkaline salt of the water-soluble reaction-product shows a precipitate upon the addition of ethanol. Proceeding as above set forth, the increase of viscosity of the water-soluble reaction product is indicative of its tendency to progress to a water-insoluble reaction-product, and the viscosity of the resin is progressively reduced by the addition of increments of alkaline material, alkali metal hydroxide, which permits a further condensation and further advancement of the resin reaction-product toward but never attaining its final state where it is insoluble in most solvents and is also infusible, said state being commonly referred to in the art as the insoluble and infusible state.

The resin may also be produced using the alternate steps of additions of alkaline material, alkali metal hydroxide, and a condensation step between each addition in which the molar ratio between the aldehyde and the phenol varies from one mole of the aldehyde to and including one and one-half moles of aldehyde for each mole of phenol. With this smaller molar ratio of aldehyde to phenol, the initial resin condensation product may become insoluble in its aqueous alkaline solution when cooled to 25° C. This point of insolubility of the alkaline resin in the aqueous alkaline solution from which the resin was produced may be taken as the point for the further addition of alkaline material, alkali metal hydroxide, to resolubilize the resin in the aqueous alkaline solution. These alternate steps are continued until the resin is permanently ethanol soluble and permanently water soluble in its own aqueous alkaline solution, whereupon upon further condensation the resin will fail to precipitate from its alkaline solution, but the viscosity of the resin will increase. However, after the resin becomes permanently ethanol and water soluble, its viscosity may be reduced by the addition of an alkaline material, alkali metal hydroxide, followed by a heating and/or condensation step, the alkaline addition functioning to decrease the viscosity of the resin which permits further heating and/or condensation to further advance the resin towards its insoluble, infusible state, but such advance steps are always discontinued before said state is attained. Both types of resin herein set forth are produced by the alternate addition of alkaline material with a heat condensation step between each addition of alkali. Employing this procedure, the advancement of the resin proceeds well along toward its insoluble and infusible state; the resin produced in either manner is so well advanced toward its insoluble and infusible state that it only takes a relatively short period of time to convert it from a thermosetting resin to its insoluble and infusible state where it forms what is known as a C-stage resin.

It has been discovered that a phenol-aldehyde resin of the character set forth may be used in the bonding of a plurality of cellulosic boards one to the other at hot-press temperatures in a shorter period of time than has been hitherto possible using the prior art monohydric phenol-aldehyde resins. Stated differently, it has been discovered that at a hot press temperature varying between 230° and 330° F. inclusive, and preferably between 240° and 285° F., the cellulose members such as wooden boards or plywood boards may be united or bonded or hot-pressed together in a period of time which is 10% to 15% less than the period of time necessary to hot-press under similar conditions an assembly containing the prior art phenol-aldehyde resins and particularly the monohydric phenol-aldehyde resins. It may be pointed out that a number of factors are involved in the bonding or construction of wooden members as, for example, plywood, such as the moisture contents and temperatures of the veneer plies, the length of stand time, and the amount of spread of the resin adhesive on the plywood elements. In view of these factors, the actual difference in pressing times of wooden and plywood assemblies employing the resins of the present invention and the prior art resins are materially less than the difference in the cure time on a hot plate of the resins utilized in carrying out the present invention and the prior art phenol-aldehyde condensation products, including the prior art monohydric phenol-aldehyde condensation products which are well exemplified by the condensation product of phenol per se $C_6H_5OH$ and formaldehyde. The cure time of the resins present in the plywood assembly of the present invention may vary from one-quarter to one-half of the cure time of the resins present in the prior art plywood assemblies using the prior art phenol-aldehyde resins.

From a process standpoint, the method of this phase of the present invention comprises bonding a plurality of cellulose members one to the other at hot-press temperatures varying from 230° to 330° F. comprising shortening the period of time that it takes to bond or adhere said units one to the other by applying to said units a thermosetting phenol-aldehyde final reaction-product of a phenol selected from the group consisting of monohydric phenols having a distillation range from between about 175° C. to 225° C., an aldehyde in which the aldehyde group is the sole reactive group, and alkaline catalyst accelerating the formation of the resin reaction product on heating, the molar ratio of the aldehyde to the phenol varying broadly from 1:1 to 3:1 and more narrowly from 1:1 to 1.5:1. The so-produced assembly carrying the above set forth binder which is well advanced toward its insoluble, infusible state is subjected to a hot-press temperature vary between 200 and 330° F. for a period of time which is 10% to 15% less than the period of time necessary to set the prior art phenol-aldehyde resins.

It has also been discovered that when the phenol-aldehyde resins produced as herein set forth are used in the production of products herein referred to, including wall boards, soft boards, webs and the like, the resins are retained on the surface of the fibers and are available to bond the fibers together.

It is desired to point out that it has been discovered that particles of the herein resin when present in an acid or neutral slurry of cellulose fibers are retained on the surface of the fibers. This discovery represents a significant advance in the art, since it is now possible to successfully use water-soluble phenol-aldehyde thermosetting resins in acid slurries, this being principally due probably to the insolubility of the phenol-aldehyde resin in the slurry.

More specifically, it has been discovered that the particles of the herein produced resin do not penetrate into the interior of the fibers as do the prior art water soluble or solvent type of phenol-aldehyde resins. Further, a high percentage of the prior art phenol-aldehyde resin condensation products remain soluble in the fiber slurry, and are lost when the water is removed from the slurry prior to the application of heat to consolidate the fiber contents of the slurry. In view of the high loss of resin, it was previously necessary to use excessive quantities of the prior art water soluble or solvent type resins in the initial fiber slurries in order that sufficient of the phenol-aldehyde condensation resin be retained by the fibers to impart to the ultimate product the necessary binding strength. In order to reduce the cost of operation because of the excessive amounts of resins used, it was necessary to provide elaborate white water recovery systems which were so highly expensive as to make the production of wallboards utilizing the prior art resins substantially impractical.

In view of the above, in the production of wallboards and other products herein set forth, resins of the solvent type were used. Resins of this character may be advanced to the stage where their insolubility in the fiber slurries after the removal of the solvent is such that they remain on the fibers and impart the necessary bonding strength to the ultimate product without the use of excessive resin. However, the process of the prior art employing said resins is highly disadvantageous in that the first cost due to the use of solvent resins and the solvent is exceedingly high. Further, it is necessary to install solvent recovery systems.

Where penetration of the character above set forth occurs, it is impractical to use the resin phenol-aldehyde binder in the production of softboards, wallboards, hardboards, paper webs and the like.

It has been discovered that the herein produced resins exhibit a high degree of insolubilization in acid or neutral solutions and are retained on the fibers when added to a slurry of cellulose fibers which is acidified, said slurry preferably having a pH varying between 3 and 10.

It has also been discovered that employing the present resins in the production of boards there is relatively little tendency for the resin to flow to the surface and edges of the fiber product while the solvent and excess water are being removed and during the period when the board is being cured or hot-pressed. Employing the prior art water soluble or solvent type of phenol-aldehyde resins, a poor board was produced, said board having a high concentration of resin contained on the faces and edges of the board producing a hard exterior surface, but at the same time the interior of the board was relatively low in resin content and, therefore, was soft and poorly bonded in the center.

In producing boards in accordance with the present invention, the following advantages are obtained:

(1) The resin molecule does not penetrate into the fiber, this being due, it is thought, to the large molecular rate or size of the resin even when it is in alkaline solution. When the resins produced as herein set forth are precipitated, they are precipitated on the surface of the fiber. In carrying out the process, therefore, the entire amount of resin added is present to give the required bonding strength. A better and more uniform distribution of the resin and the fibers are retained and a lower percentage of resin may be used than when carrying out the prior art processes. In general, the resin may be present in the slurry in amounts varying between 0.5% and 15% and preferably between 1.5% and 3.5% or even more narrowly between 1.0% and 3.0% taken on the dry weight of the fiber content of the slurry.

(2) No elaborate recovery systems are necessary. In processes now in use in the art employing either solvent or water soluble resins, solvent or white water recovery systems are necessary. Because of the high degree of insolubility of the resins herein set forth in an acid solution, the resins adhere to the cellulose fibers and relatively little of the resin is lost in the white water. Therefore, it is not necessary to recover the resin present in the white water. Laboratory experiments show that the fibers retain 95% of the resin. In commercial practice, this is slightly less and usually around 85% to 90%.

(3) In carrying out the present invention, after the highly advanced water soluble phenol-aldehyde resins herein set forth have been acid precipitated, there is very little flow of these resins into the fibers and, therefore, the resins remain in situ during the dehydration and pressing cycles resulting in an exceedingly uniform and stable fiber product.

The following is an example illustrative of the manufacture of wall boards utilizing the resins herein set forth. An aqueous pulp of cellulosic fibers produced in a McMillan defiberizer has added thereto 3.5% of the resin produced as herein set forth, said resin being water soluble and showing a precipitate on the addition of ethanol. There may be also added to the pulp any of the prior art sizes, as for example .5% of a paraffin size. These percentages are on a solids basis, that is taken on the weight of the substantially dry cellulosic fibers prior to their admixture with water to form a slurry. The pH of the resin pulp mixture is maintained at about 9.5 to 9.8. Since the resin is water soluble in an alkaline solution, the resin does not precipitate. The resin remains in solution for a suitable period of time. Thereafter there is added to the cellulose slurry powdered alum for the purpose of precipitating the resin, the pH of the slurry being adjusted to the acid side, as for example to approximately 5.5, although obviously this can be greatly varied. The usual pH meter is used in adjusting the pH of the aqueous slurry.

A wet sheet of cellulosic fibers may be formed from the slurry in the manner well known in the art. One method that may be used is as follows: a concentrated pulp is pumped into a rectangular tank having a common opening with the white water tank. The pulp and white water are discharged simultaneously into the deckel box which accomplishes a thorough mixing of white water and pulp. Air agitation is used to further even out the distribution of the pulp. Thereafter the air is turned off and a vacuum is applied to the white water tank which draws the water through the bottom of the deckel box and filters the fibers out on the screen, thereby forming the wet sheet. The consistency of the slurry in the deckel box is 0.7%. The sheet may be dewatered in any well known manner. One method of de-watering is to use a hydraulic cold press at a pressure of 20 p. s. i.

The wet sheet may be dewatered and pressed in any well known manner. One method of accomplishing the same is to take the wet sheet produced as above set forth and having a moisture of 75 to 80% on a wet basis and place the sheet on a screen, the assembly being drawn into a hot press between the steam heated plates. A stainless steel sheet is used to give the finished surface to the board. 150 pounds of saturated steam heats the plates, and a cycle of 15 to 18 minutes is required to remove the moisture from the board. A pressure of 250 p. s. i. is maintained for five or six minutes, and the remainder of the pressing is accomplished at 100 p. s. i. The so-treated boards may then be removed from the press and placed in racks for humidification. The finished boards contain an exceedingly small amount of moisture and are close to zero-moisture content, and therefore it is necessary to condition the boards to prevent warping and distortion when they are used. This conditioning is accomplished in a controlled humidity chamber in a manner well known in the prior art where conditions are maintained to impart 8% moisture content to the board in four hours.

A further example showing the production of wet strength paper is as follows: the paper which was made was black wet strength paper, 60 lb. weight adapted to be used in bag liners. To a slurry of cellulosic fibers which was alkaline in character there was added carbon black and rosin in an amount equal to about 3% taken on a dry solids basis of the cellulose fiber present in the slurry. There was then added sufficient alum to convert the slurry to an acid state, the preferred pH of the slurry being about 4.5. There was then added to the acid slurry an alkaline solution of the resin produced as herein set forth, said resin being water-soluble but showing a precipitate on the addition of ethanol. During the time that the resin was added readings were taken and if the pH varied materially from 4.5, more alum solution was added at the stuff box. The concentration of the alum solution was one pound of aluminum sulfate per gallon. Enough resin solution was added to provide a 3% concentration taken on a solids basis, that is 3% taken on the weight of the substantially dry cellulosic fiber prior to its introduction into the aqueous bath to form the slurry. Thereafter the slurry was dewatered to produce a highly concentrated slurry after which the slurry was formed into a web and dried at a suitable temperature which may be varied between 200° and 225° F.

The following table illustrates the high modulus of rupture obtained when employing the resins of the present invention in the production of wallboard; the table also shows the time, temperature and pressure used in forming the board.

TABLE I

| Type of Fiber | Percent Resin | Pressing Conditions | | | Modulus of Rupture, p.s.i. |
|---|---|---|---|---|---|
| | | Time, min. | Pressure, p.s.i. | Temp., °F. | |
| Asplund plus Bauer | 0 | 20 | 300 | 400 | 5,450 |
| Asplund plus Bauer | 4.0 | 20 | 300 | 400 | 8,550 |
| Allis-Chalmers Attrition Mill | 0 | 4 / 10 | 300 / 150 | 400 | 2,750 |
| Allis-Chalmers Attrition Mill | 4.1 | 4 / 10 | 300 / 150 | 400 | 5,350 |
| Allis-Chalmers Attrition Mill | 4.3 | 4 / 16 | 300 / 150 | 400 | 5,650 |
| Allis-Chalmers Attrition Mill | 4.6 | 4 / 10 | 300 / 150 | 400 | 6,850 |
| Allis-Chalmers Attrition Mill | 5.0 | 4 / 10 | 300 / 150 | 400 | 7,050 |
| Core Stock | 10.0 | 130 | | | 2,800 |
| Medium Density | 9.4 | 90 | | | 2,700 |

The resin used to produce the above notable increases in tensile strength is formulated from a blend of 50% of resin A and 50% of resin B, said resins being prepared as herein set forth.

EXAMPLE 1

*Preparation of resin A*

100 phenol
93.6 water
177.5 37% formaldehyde
37.9 50% NaOH
  Mix and bring to 100° C. in 100 minutes. Reflux to 0.50 poise, cool to 72° C. in 140 minutes 32–36 poises 8.9 50% NaOH 5.5–8.8 poises
  Hold 75° C. for 40 minutes to 6.0–10.00 poises 19.3 50% NaOH, 2.75–3.00 poises
  Hold at 80° C. for 60 minutes. Cool below 40° C. 4.30–5.00 poises The molar ratio of the phenol to the formaldehyde was 2.04 to 1. The initial amount of caustic soda was used in the ratio 0.45 mole for each mole of phenol. The total caustic used was 0.79 mole for each mole of phenol. The final viscosity varied between 4.3 and 5 poises and the pH of the final aqueous resin solution was 12.68.

More specifically, the resin is produced in the following manner: the phenol is pre-mixed with 11 parts of water to facilitate handling and is placed in an agitated jacketed reaction kettle. All during the addition of the reagents and during the reaction the materials are agitated. In this example 82.6 parts of water is the preferred amount added at this point. To the above aqueous solution, which is maintained, preferably at 20° C., aqueous commercial, or C. P. 37% formaldehyde solution, which may contain up to 15% methanol is added. The amount is 177.5 parts or 2.04 moles of formaldehyde to one mole of phenol.

After the formaldehyde has been thoroughly mixed with the above constituents and while the temperature is still maintained a 20° C., a 50% aqueous sodium hydroxide solution is added. The 50% concentration is used because of its availability and ease of handling. For this example, the 50% caustic solution is 37.9 parts, which is a ratio of 0.44 mole of the caustic per mole of phenol.

After the caustic is added, the reaction mixture is heated with constant agitation to a point where the mixture begins to boil and is refluxed. The time taken to raise the reaction mixture to the boiling temperature is from 80 to 120 minutes for this example.

The reaction mix is refluxed until the alkaline solution has reached a predetermined viscosity of $0.50\eta$. This viscosity can be varied, depending upon the composition of the reaction mixture and the properties of the desired resin. In this example, the reaction is then gradually cooled to 70° to 73° C. over a period of from 60 to 140 minutes and held until a preferred viscosity of 32 to $63\eta$ is obtained, with a maximum variation between 22 and 100 poises. The Greek letter "eta" denotes poises.

At this point the neutralized resin is from 85% to 90% water insoluble. The time and temperatures stated here are preferred for this example, but longer times may be used at temperatures as low as 40° C. and shorter times at temperatures as high as 100° C.

At this stage, which is the normal end-point for water soluble resins of the prior art, 8.9 parts of 50% aqueous caustic solution or its equivalent in other alkalies is added in order that the reaction may be continued. This caustic addition solubilizes the resin in the alkaline solution and decreases the viscosity to give 5.5 to 8.8 poises. The amount of caustic added at this stage varies from the stated amount, as the formaldehyde-phenol ratio and the time-temperature ratio varies. The quantity of caustic required is determined by the amount necessary to solubilize the reaction products. Without this caustic addition, continuation of the heating of the resin will advance it quickly into the C-stage. The reaction is continued at 70° to 80° C. for 40 minutes or the equivalent time-temperature ratio, to obtain a viscosity of 6 to $10\eta$ and a neutralized resin which is 87.5 to 92.5% water insoluble but will still flow under pressure.

At this stage, 19.3 parts of 50% caustic are added to reduce the viscosity of the reaction mix from 6 to 10 poises to 2.75 to 3.00 poises. Broadly, this caustic may again vary from this stated amount depending upon the original ratio of the reacting constituents and the time-temperature ratio employed in the reaction. In all cases, the amount required is determined by the desired reduction in viscosity or increase in solubility.

The specific reaction is continued at 75° to 85° C. until a final preferred viscosity of 4.3 to $5.0\eta$ is reached. The final pH is 12.60 to 12.80.

*Preparation of resin B*

The following ingredients in the proportions set forth are used to prepare the resin:

36.60 gms. U. S. P. phenol
43.00 gms. 37% formaldehyde
4.11 gms. water
6.78 gms. 50% NaOH
9.51 gms. 50% NaOH The phenol-formaldehyde initial alkali in the amount of 6.78 grams of 50% sodium hydroxide and water are mixed and brought to a refluxing temperature of 100° C. in about 60 minutes. The reaction mass is then further refluxed for a period of about 40 minutes until the viscosity of approximately 0.85 poise is obtained. Thereupon the reaction mass is gradually cooled to 75° C. in an additional 70-minute period. When the resulting resin mass has attained a viscosity of approximately 2.75 poises, the mass is cooled to 60° C. and a second addition of alkali is made in the amount of 9.51 grams of 50% sodium hydroxide. The resulting product is cooled to room temperature and has a viscosity of 3.2 to 3.4 poises and a pH of 12. This B-resin is blended with the A-resin to thereby provide a final product that is ethanol-insoluble and water-soluble with a viscosity of 6 to 8 poises and a pH of 12. The viscosity can be varied considerably and the pH can be varied somewhat. This blended resin gives very excellent results in the production of softboard. However, very satisfactory results are obtained using any of the resins herein set forth.

The following is an example illustrating the production of plywood in accordance with the present invention. The resin produced as herein set forth is mixed with water and a suitable filler or extender and blended until a uniform lump-free mix is obtained. A representative example of a suitable mix is 500 parts of liquid resin having the viscosity shown in any of the examples herein set forth, 80 parts of water, and 80 parts of walnut shell flour. The resulting extended resin is spread, usually by a mechanical spreader consisting of 2 rollers on both sides of a piece of veneer core stock at the rate of 20 pounds to 80 pounds of resin per 1000 square feet of core. The latter is laid upon a piece of veneer face stock, the grain of the veneers being in cross directions. Another piece of veneer stock is placed upon the spread core stock. This cross directional build-up is continued until a panel of the desired thickness is obtained. Usually the number of plies varies from 3 to 7.

After the panel is assembled, it is allowed to stand for a definite period of time. This elapsed time is designated as the "stand time" and may vary from 1 to 60 minutes or more, depending on the particular properties of the resin adhesive being used. After the assembled panel has stood for a period of time, it is placed in a hot press where it is pressed under suitable pressure and at a suitable temperature for a predetermined length of time. For example, a three-ply $\frac{7}{16}$ panel is pressed at 200 pounds per square inch at 140.5° C. for 3.5 minutes. At the end of the pressing cycle, the press is opened and the panels removed. The time of pressing may in general vary from 3.0 minutes to 10.0 minutes, which is much shorter than the time of pressing when utilizing the prior art monohydric phenol-aldehyde resins wherein the time of pressing is usually 3.5 to 13.0 minutes for substantially identical constructions under substantially identical conditions. As previously set forth, the curing times of the resins used in carrying out the present invention are much shorter than the curing times of the prior art resins.

Only a short final reaction period is necessary to convert the phenol-aldehyde binder, as herein set forth, to its final insoluble and infusible state where it can not be further resolubilized by further additions of an alkaline material.

In the use of the present invention in fiber improvement, the water soluble phenol-aldehyde resin condensation product in its advanced stage of condensation produced by a series of alkaline additions with condensation in between each alkaline addition, is added to and evenly dispersed in the paper slurry or web, the slurry being acidified to a pH which will insure substantially complete precipitation of the phenolaldehyde condensation product from its aqueous solution. The pH of the slurry may vary from 4 to about 9. It is highly desirable to acidify the slurry to a pH of about 4 or 5 and preferably 5 in order to insure complete precipitation or substantially complete precipitation of the resin. However, the resinous phenol-aldehyde condensation product will start precipitating at a much higher pH, even as high as 8 or 9. The precipitating agents are usually alum, hydrochloric acid or sulfuric acid. The pH of an unacidified cellulosic pulp resin slurry suitable for the production of paper is between 10 and 12. The unacidified paper slurry that is used in the production of softboards and hardboards usually has a pH of between 8.5 or 9 to 10 or 10.5. The slurries in the unacidified state are, therefore, alkaline and the resinous condensation product of the present invention when added thereto is in solution in the aqueous alkaline slurry. In order to precipitate the resin it is necessary to acidify the slurry so that its pH is reduced below the neutral point as, for example, to a pH varying between 3 and 6 or 6.5. As stated, the resin will start precipitating at around 8 but in order to insure substantially complete precipitation on the fiber of the slurry, the pH should be reduced to between 3 and 5 or 6. After the acid has been added, the slurry has the excess water removed therefrom usually by a suction action and the fibers are heated to set the resin to the final insoluble, infusible state. In the production of fiber boards, the heating may take place in a press or drying oven. In paper making, the heating is usually effected on calendering rolls.

In the production of pulp and paper board, there is usually formed a slurry of water and waste wood, the latter having been broken down by various mechanical processes or by chemical means or by a combination thereof. The pH of the slurry is adjusted to approximately 10 and the phenol-aldehyde condensation product produced as herein set forth is then added thereto in amounts varying from .5 to 80% based on the dry weight of the pulp solids. In wet strength paper the preferred amounts range from 3 to 18%. In soft and hardboard slurries, the percentage of resin may vary between 1 and 30%, satisfactory results being obtained when about 3.5% of the resin is added to the cellulosic fiber slurry adapted to produce paper and when 1.5% is added to the cellulosic fiber slurry to produce softboards.

After obtaining a uniform dispersion of the resin in the fiber slurry, the resin is precipitated on and in the fiber by reducing the pH of the slurry to 4.5 plus or minus about 1. The fiber slurry containing the precipitated resin is then formed on a screen and the excess water removed by suction. This water may be returned and reused in the process. The pulp mass is then pressed and dried as is usual in the art and the dried mass is hot pressed to convert the thermosetting resin binder adhesive of the mass into a C-stage resin which is the resin in its final insoluble, infusible form.

In the production of softboard or wallboard, the dried slurry may be heated to a temperature varying between 300° to 400° F. for a period varying between 4 and 20 minutes and at a pressure varying from 100 to 300 pounds per square inch. In the production of paper web containing the binder of the present invention, the web may be heated at a temperature of 200° F. for approximately one minute. It is to be understood that the temperatures, pressures and times may vary considerably depending on the particular kind of board or paper machine used and the type and quality of the desired product.

The resins of the present invention may also be used to impregnate fibrous materials other than paper as, for example, a web or cloth or any other fibrous material already formed including fabrics formed from mineral fibers. Previously formed webs may be impregnated either by a batch process or by a continuous operation along the sheet or web. In the continuous process of impregnating a fibrous sheet or web of material, the material to be impregnated is run through an aqueous solution of the phenol-aldehyde condensation product produced in accordance with the present invention in a concentration dependent upon the percentage of resin desired in the finished product. After the fibrous material has been completely saturated, it is run from the resin bath through a set of squeegee rolls or doctor blades to remove the excess resin solution. The web is then run through an acidifying bath adjusted to a pH of approximately 4.5 plus or minus 1. This acid bath may contain any of the acids previously mentioned for acidifying and precipitating the resin condensation product on or in the fibrous material. When the sheet is run through the acidifying bath, the phenolaldehyde condensation product is deposited in situ on and in the fibers of the web. As the web leaves the acidifying bath, it is doctored to remove the excess acid. The web is then passed over and between heat and pressure rolls to set the resin and obtain the desired finish for the web.

If it is desired, a web may be impregnated by resins of the present invention by a batch treatment. In such treatment, the web is placed in a solution of resin which solution is at a concentration depending upon the amount of resin desired in the finished web. When the web has been thoroughly impregnated with the resin by mechanical agitation or other desirable means, the batch is acidified by adding acid of the nature previously set forth to precipitate the resin in and on the fibers of the web. After precipitation of the resin in the fibers of the web, the sheet or web is removed from the batch and then subjected to heat and pressure to set the resin and obtain the desired finish for the web.

The following are additional examples showing the proportion of thermosetting water soluble phenol-aldehyde resins which are well advanced towards the insoluble and infusible C-stage but never attain said C-stage.

EXAMPLE 2

100 U. S. P. cresol
81.3 water
142.2 37% formaldehyde
33.0 50% NaOH

Mix and bring to 85° C. in 100 minutes. Hold for 80 minutes, 10.00$\eta$. Cool to 65° C. Hold for 67 minutes, 46.00$\eta$ 7.9 50% NaOH
Hold at 65° C. for 13 minutes, 10.70$\eta$ 17.6 50% NaOH
Raise to 80° C. and hold for 86 minutes, 3.30$\eta$ Cool below 40° C.

Final: 3.30$\eta$, pH 13.02, 42% solids. Ratio: 1.9:0.79:1.0

EXAMPLE 3

100 petroleum cresylic
81.3 water
142.2 37% formaldehyde
33.0 50% NaOH

Mix and bring to 61° C. in 100 minutes and hold to 0.50$\eta$. Cool to 58° C. in 80 min. 5.0$\eta$ 7.9 50% NaOH, 2.70$\eta$
Cook at 58° C. for 27 minutes, 5.00$\eta$ 17.6 50% NaOH, 2.60$\eta$
Cook at 60° C. for 12 minutes. Cool below 40° C. 3.70$\eta$ Final: 3.70$\eta$, pH 12.72, 42% solids. Ratio: 1.9:0.79:1.0

EXAMPLE 4

100 phenol
350.9 water
193.9 furfural
37.9 50% NaOH

Mix and bring to 98° C. in 100 minutes 9.0 50% NaOH
Reflux for 5 minutes to insolubility 6.8 50% NaOH
Reflux for 87 minutes to insolubility 2.1 60% NaOH
Reflux for 13 minutes to insolubility 2.9 50% NaOH
Cool to 90° C. in 56 minutes to insolubility 8.5 50% NaOH. Cool below 40° C. 3.10$\eta$ Final: 3.10$\eta$, pH 11.70, 42% solids. Ratio: 1.9:0.79:1.0

EXAMPLE 5

100 phenol
228.2 water
89 acetaldehyde
37.9 50% NaOH

Mix and bring to 100° C. in 100 minutes. Reflux 73.6 60% NaOH added in small increments during reflux, insolubility control Total reflux time 905 minutes. Cool below 40° C.

Final: 42% solids. Ratio: 1.9:1.33:1.0

EXAMPLE 6

100 phenol
364.3 water
214.3 benzaldehyde
37.9 50% NaOH

Mix and bring to 100° C. in 100 minutes. Reflux 178.6 50% NaOH added in small increments during reflux, insolubility control Total reflux time 1,120 minutes. Cool below 40° C.

Final: 60% solids. Ratio: 1.9:2.55:1.0

EXAMPLE 7

100 phenol
131 water
108 formaldehyde
5.2 50% NaOH

Mix and bring to 100° C. in 90 minutes. Reflux for 70 minutes to insolubility 4.0 50% NaOH
Reflux for 30 minutes to insolubility 4.0 50% NaOH
Cool to 90° C. Hold for 30 minutes to insolubility 5.6 50% NaOH Cool to 75° C. Hold for 30 minutes. Cool to 40° C. 4.75–5.00η

Final: 4.75–5.00η, pH 10.25, 38% solids, Ratio: 1.25:0.22:1.0

EXAMPLE 8

100 phenol
106.3 water
172.2 37% formaldehyde
40.25 50% NaOH

Mix and bring to 95° C. in 120 minutes. Reflux for 100 minutes. Cool to 60° C. 1.484η

9.53 50% NaOH

Cool below 60° C. 46.3η

Final: 46.3η, pH 10.5, 42% solids. Ratio: 2.00:0.585:1.0

In the above examples, the symbol "η" (eta) indicates poises. The ratios set forth are molar ratios of aldehyde to caustic to phenol. When in Example 2 there is found the expression "7.0 50% NaOH. Hold at 65° C. for 13 minutes, 10.70η," the meaning is that the stated velocity is controlling, and that the time may vary as it is only of secondary importance. Where the reaction is indicated as being carried to insolubility, this means insolubility at 25° C. In all the above examples, the limits of the aldehyde to the formaldehyde is one mole of formaldehyde to 3 moles of formaldehyde for each mole of phenol.

The following are examples of the production of resins which are water soluble and ethanol soluble, said resins being produced by the alternate addition of an alkaline material followed by condensation between each addition of alkaline material, the condensation being carried each time to the so-called "insoluble point," that is each time the resin is heat reacted the condensation is prolonged until the resin reaction product is substantially insoluble in its aqueous alkaline solution as evidenced by the solution becoming cloudy when a sample thereof is cooled to 25°. All of the resins of the following examples are made with a molar ratio of the aldehyde to the phenol varying from 1.1 to 1.5:1.

EXAMPLE 9

| | Grams |
|---|---|
| Phenol | 26.25 |
| Formaldehyde 37% | 28.30 |
| Water | 37.38 |
| Sodium hydroxide 50% | 1.37 |

The above mixture is gradually heated with continuous agitation to a reflux temperature of approximately 100° C. in 90 minutes. This refluxing is then continued for approximately 60 minutes at which time the aqueous solution of the resin has a pH of 9.35 and a sample of the resin when cooled to 25° C. becomes cloudy, indicating that the resin, that is, the sodium salt of the resin, is no longer soluble in the alkaline solution at a temperature of 25° C. Thereafter 1.05 grams of 50% sodium hydroxide are added. This addition of alkaline material functions to resolubilize the resin with the resulting aqueous alkaline solution of the resin having a viscosity of 0.25 poise and a pH of 9.65. The resulting aqueous alkaline solution of the resin is then refluxed for 45 minutes. A sample of the resin taken at this point and cooled to 25° C. becomes cloudy. Then the second addition of alkaline material is made to the so-condensed aqueous alkaline solution, 50% sodium hydroxide being again added in an amount of 1.05 grams to bring the resin reaction-product in solution in its aqueous alkaline carrying medium, that is, to effect resolubilization of the condensed resin reaction-product. The resulting aqueous alkaline resin solution has a viscosity of 1.65 poises and a pH of 10.10. The resulting product is then refluxed at approximately 90° C. for 60 minutes. When a sample of the so-treated resin taken at different times during refluxing shows that on cooling to 25° C. the alkaline salt of the resin has become insoluble in the aqueous alkaline solution, a third increment of sodium hydroxide is added, namely, 4.60 grams of 50% sodium hydroxide. The resulting aqueous alkaline solution of the resin has a viscosity of 3.00 poises and a pH of 12.25. The temperature of the resulting reaction mixture is allowed to drop to approximately 70° C. and then maintained until a viscosity of 5.00 to 5.50 poises at 25° C. at a pH of 12.25 is obtained. Thereafter the aqueous solution of the resin reaction-product is cooled to room temperature, that is, 25° C. The alkaline solution of the resin at this point is both water-soluble and ethanol-soluble.

In this example, the molar ratio of the formaldehyde to the phenol is 1.25 moles of formaldehyde to one mole of phenol. The ratio of the alkaline material to the phenol used in producing the initial reaction product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide, is 0.36 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

EXAMPLE 10

A mixture is made of the following ingredients at room temperature, that is, 25° C.:

| | Grams |
|---|---|
| Phenol | 25.20 |
| Formaldehyde 37% | 27.14 |
| Water | 35.83 |
| Sodium hydroxide 50% | 1.31 |

The mixture containing the initial alkaline phenol-formaldehyde condensation product is condensed and thereafter the resulting reaction-product is condensed in exactly the same manner as in Example 9, the following amounts of alkaline material, expressed as sodium hydroxide, being used at each addition of alkaline material:

| | Grams |
|---|---|
| Sodium hydroxide 50% | 1.01 |
| Do | 1.01 |
| Do | 8.50 |

After the addition of the final alkaline increment, the resulting aqueous alkaline resin solution is cooked at 90° C. until a viscosity of 30.00 to 40.00 poises is obtained.

In this example, the molar ratio of the formaldehyde to the phenol is 1.25 moles of formaldehyde to one mole of phenol. The ratio of the alkaline material to the phenol used in producing the initial reaction-product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide, is 0.55 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore is the full equivalent of the sodium hydroxide.

EXAMPLE 11

A mixture is made of the following ingredients at room temperature, that is, 25° C.

| | Grams |
|---|---|
| Phenol | 26.25 |
| Formaldehyde 37% | 23.35 |
| Water | 52.51 |
| Sodium hydroxide 50% | 1.37 |

The mixture is gradually heated with continuous agitation to a reflux temperature of approximately 100° C. for approximately 60 minutes. At this point a sample shows the resin is no longer soluble in the aqueous alkaline solution at 25° C. In order to solubilize the resin in the aqueous alkaline solution, 1.05 grams of 50% sodium hydroxide are added. The so-treated phenol-formaldehyde condensation product is then further refluxed at a temperature of about 90° C. for approximately 120 minutes. During this heating period condensation of the resin reaction-product continues and at the end of 120 minutes a sample of the resin shows that it is no longer soluble in its aqueous alkaline solution at 25° C. Then a third addition of alkaline material is made. More specifically, 1.05 grams of 50% sodium hydroxide are again added to resolubilize the alkaline salt of the phenol-formaldehyde resin. The resulting mix is again refluxed at 90° C. for 120 minutes until a sample of the reacted mix when cooled to 25° C. shows the resin to be insoluble in its alkaline solution. The fourth addition of alkaline material is then made in the amount of 5.95 grams of 50% sodium hydroxide. The resin at this point is soluble in the alkaline solution and has a viscosity of less than 0.50 poise. The resin is then heat-treated at 100° C. for 60 minutes until it has attained a viscosity of approximately 30 poises. The resin solution is then cooled to room temperature, that is, 25° C.

In this example, the molar ratio of the formaldehyde to the phenol is 1.03 moles of formaldehyde to one mole of phenol. The ratio of the alkaline material to the phenol used in producing the initial reaction-product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide is 0.42 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide. The resulting resin is ethanol and water soluble.

EXAMPLE 12

A mixture is made of the following ingredients at room temperature, that is, 25° C.

| | Grams |
|---|---|
| Phenol | 26.25 |
| Formaldehyde 37% | 34.00 |
| Water | 34.10 |
| Sodium hydroxide 50% | 1.37 |

The mixture is reacted in exactly the same manner as set forth in Examples 1 and 4 until the first point of insolubilization is attained in 160 minutes. At this point 3.15 grams of 50% sodium hydroxide are added. The mixture is kept at a heated state but at a reduced temperature of 80° C. for a period of 60 minutes with the result that the aqueous phenol-formaldehyde condensation product is further advanced. After about 60 minutes a sample thereof when cooled to 25° C. shows that the resin has become insoluble in its aqueous alkaline solution and, therefore, 2.10 grams of 50% sodium hydroxide are added. The resulting resinous mixture is then heat-treated for 60 minutes at 85° C. to further advance the condensation of the phenol-formaldehyde resin reaction-product until a viscosity of 10.00 poises is attained.

In this example, the molar ratio of the formaldehyde to the phenol is 1.50 moles of formaldehyde to one mole of phenol. The ratio of the alkaline material to the phenol used in producing the initial reaction product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide, is 0.30 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide. The final resin is ethanol and water soluble.

EXAMPLE 13

A mixture is made of the following ingredients at room temperature, that is, 25° C.

| | Grams |
|---|---|
| 3.5 xylenol | 122.6 |
| Formaldehyde 37% | 101.2 |
| Water | 197.2 |
| Sodium hydroxide | 5.55 |

The above mixture is agitated and heated until a temperature of 85° C. is attained in 150 minutes. During this period the reaction mixture forms a two-phase system. When the two-phase system is formed, 4.25 grams of 50% sodium hydroxide are added. On the addition of the alkaline material, the two-phase system disappears but forms again on further condensation. Six additions, each of 4.25 grams of sodium hydroxide are added. After each addition, the solubilized resin is heat-treated to further advance the resin, that is, to further condense the resin. After the six additions of sodium hydroxide the resin is soluble in the alkaline solution and in ethanol, but not in water. The temperature of the reacting mix after six additions of sodium hydroxide as specified is dropped to 80° C. and there maintained for 20 minutes. After being further condensed for a period of 20 minutes at 80° C., 8.50 grams of 50% sodium hydroxide are added which functions to resolubilize the resin which becomes insoluble in the previous heating step. On this last addition, the resin solution becomes both ethanol and water soluble and has a viscosity of 3.00 poises. The condensation is then continued at 80° C. for 60 minutes until the solution has a viscosity of approximately 30.00 poises. The mixture is then cooled to a temperature of 25° C.

In this example, the molar ratio of the formaldehyde to the 3.5 xylenol is 1.25 moles of formaldehyde to one mole of 3–5 xylenol. The ratio of the alkaline material to the 3–5 xylenol used in producing the initial reaction-product, said alkaline material being expressed as sodium hydroxide, is 0.069 mole of sodium hydroxide to one of 3–5 xylenol  The ratio of the total alkaline material used in carrying out the process to the 3–5 xylenol, said total amount of alkaline material being expressed as sodium hydroxide, is 0.49 mole of sodium hydroxide to one of the 3–5 xylenol. The final resin is both water and ethanol soluble.

EXAMPLE 14

A mixture is made of the following ingredients at room temperature, that is, 25° C.:

|  | Grams |
| --- | --- |
| Cresylic acid | 108.13 |
| Formaldehyde 37% | 101.20 |
| Sodium hydroxide 50% | 10.00 |
| Water | 30.00 |

The mixture is agitated and heated at such a rate that a temperature of 98° C. is obtained in 100 minutes. At the end of this period the resin will form a cloudy two-phase system, indicating that the alkaline salt of the resin has been precipitated. On the addition of further alkaline ingredient the two-phase system disappears and forms again on further condensation of the resin. Over a period of 30 minutes there are eight distinct additions of sodium hydroxide, 7.5 grams of 12.5% solution of sodium hydroxide being added about every 3½ minutes. This addition of sodium hydroxide solubilizes the resin, and at this stage the resin is soluble in ethanol and in the alkaline solution, but not in water. A further addition of 75 grams of 12.5% sodium hydroxide solution is then made and on this addition the resin becomes both ethanol and water soluble and has a viscosity of less than 0.50 poise.

Thereafter the resin solution is refluxed at a temperature of approximately 100° C. for 120 minutes until it has obtained a viscosity of 27.0 poises. This heat condensation step advances the resin toward its insoluble and infusible state, but said state is never attained. Due to the presence of sufficient alkali, the resin does not become insoluble in the aqueous alkaline solution and, therefore, stays in solution; that is, the resin does not become insoluble. After the last refluxing step, 75 grams of water are added to produce a viscosity of approximately 1.50 poises. Thereafter the resin is condensed and further advanced toward the resin which will set into an infusible and insoluble state, but said state is never attained. The condensation produces a multiplication of linkages and there is, as a result of the condensation, long and more cross-chains of linkages. After the addition of water, the condensation is continued at refluxing temperature of about 100° C. until a viscosity of 5.00 poises is attained. The resulting aqueous resin solution is cooled to about 25° C. at which point it has a viscosity of 8.00 to 10.00 poises and is both ethanol and water soluble. The cresylic acid used is a crude alkyl phenol with a distillation range between 199° C. and 225° C. and is known as Shell's type 2000.

In this example, the ratio of the formaldehyde to the cresylic acid is 1.25 moles of formaldehyde to one mole of cresylic acid. The ratio of the alkaline material to the cresylic acid used in producing the initial reaction-product, said alkaline material being expressed as sodium hydroxide, is 0.125 mole of sodium hydroxide to one of cresylic acid. The ratio of the total alkaline material used in carrying out the process to the cresylic acid, said alkaline material being expressed as sodium hydroxide, is 0.55 mole of sodium hydroxide to one mole of cresylic acid. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

EXAMPLE 15

An ethanol-soluble and water-soluble resin may be made in accordance with the present invention from a mixture of a dihydroxy phenol as, for example, resorcinol, and a monohydroxy phenol having a distillation range between about 175° C. and about 225° C., said monohydroxy phenols including phenol per se, cresylic acid, xylenol including 3–5 xylenol, metacresol and mixtures of phenol and metacresol or mixtures of phenol and xylenol or mixtures of phenol, metacresol and 3–5 xylenol.

EXAMPLE 16

A mixture is made of the folowing ingredients at room temperature, that is, 25° C.:

|  | Grams |
| --- | --- |
| Furfural | 19.32 |
| Phenol | 18.70 |
| Sodium hydroxide 50% | 0.80 |
| Water | 2.10 |

The mixture is refluxed at approximately 103° C. for about 120 minutes until a viscosity of approximately 0.50 poise is obtained. Then 14.80 grams of 4 N sodium hydroxide are added and the refluxing continued for 90 minutes, at which point the alkaline salt of the resin becomes insoluble in the aqueous alkaline solution resulting from the initial mix. The aqueous solution of the resin has a viscosity of 10 to 11 poises. The resin is resolubilized by adding 29.60 grams of 4 N sodium hydroxide, the viscosity decreasing on the addition of the alkali to between 2 and 2.5 poises. Refluxing of the resin mass is continued until a viscosity of 3.5 poises is obtained. The reaction mass at this point has reached the stage where the alkaline salt of the resin is about to be thrown out of solution. Therefore, 14.80 grams of 4 N sodium hydroxide are added. This reduces the viscosity to approximately 0.80 poise on the addition of the alkali. After this addition of alkali, the resin mass is refluxed until a viscosity of 1.5 poises is attained. The resulting aqueous alkaline solution of the resin is then cooled to room temperature. In this example, the molar ratio of the furfural to the phenol is 1.03 moles of furfural to one mole of phenol. The ratio of the alkaline material to the phenol used in producing the initial reaction-product, said alkaline material being expressed as sodium hydroxide, is 0.049 mole of sodium hydroxide to one of the phenol. The ratio of the total alkaline material used in carrying out the process to the phenol, expressed as sodium hydroxide, is 1.20 moles of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide, and, therefore, is the full equivalent of the sodium hydroxide.

In producing the resin, many, if not all, of the bases of the alkali metals and the alkaline salts of the alkali metals may be used for solubilizing and for catalyzing during the initial reaction period. The alkaline material functions to raise the pH of the aqueous alkaline solution. Some of the bases of the alkali metals and the alkaline salts of the alkali metals that may be used are the carbonates and hydroxides of sodium, potassium, lithium, barium, calcium, and magnesium. Ammonium hydroxide and ammonium carbonate may also be used. The catalyst during the initial reaction period and during the later addition periods may be organic compounds as, for example, the highly concentrated organic amines such as the ethanol amines. The weaker organic bases and the weaker inorganic salts may be used for raising the pH in the lower pH ranges as, for example, around 9.9 and 9.5 and stronger organic and inorganic alkaline agents may be used to raise the pH in the upper pH ranges. The function of the alkaline material during the addition steps is to raise the pH of the alkaline solution of the phenol-aldehyde condensation product and thereby increase the solubility of the sodium salt of the phenol-aldehyde condensation product in its aqueous alkaline carrying medium. In general, the pH of the final condensation product should vary from about 9 or 9.5 to about 14. The catalyst in the original reaction and the alkaline addition product used later on may be sodium, lithium or potassium phenate. The alkali constituent or the alkaline earth constituent may be combined with the phenol prior to its use. During the initial catalyzing stage and during the later addition stages, the alkali should be present in such a form as to insure its availability for combination with the phenolaldehyde reaction-product as, for example, phenol-formaldehyde reaction-product during its water-soluble stage. In general, any salt of a phenol may be used which will release an element which will form an alkaline solution, that is, which will release a constituent which when added to the initial condensation product of the phenol and the aldehyde will function to go into solution in the aqueous alkaline medium and form an alkaline salt of the phenol condensation product.

The pH may be measured with a Beckman pH meter with a calomel electrode and a lithium glass electrode and standardized at pH 10 to compensate for the alkali metal ion effect.

As an example of aldehydes which may be condensed with the monohydroxy or dihydroxy phenols or mixtures thereof, there is set forth formaldehyde, acetaldehyde, benzaldehyde, propionic aldehyde, the butyl aldehydes, furfural aldehydes, and the like. Instead of using a single aldehyde, it is within the province of the present invention to react the phenol or mixture of phenols with a mixture of aldehydes as, for example, a mixture of formaldehyde and butylaldehyde. Di-aldehydes may be used in place of the mono-aldehydes.

The amount of alkaline catalyst used in effecting the initial condensation of the phenol and the aldehyde may broadly vary from about 1.00 to 8.5% on the weight of the phenol and preferably varies between about 2.0% and about 5.0%, and more specifically between 2.08 and 5.32%, taken on the weight of the phenol. Expressed differently, the amount of alkaline constituent used for catalyzing the initial reaction between the phenol and the aldehyde should be that amount which is capable of producing an alkalinity equivalent preferably to that produced by 0.049 to 0.125 mole of sodium hydroxide per mole of phenol and more broadly this may vary from 0.025 to 0.20 mole of sodium hydroxide per mole of phenol.

It is recognized that the initial condensation may be effected without the use of an alkaline catalyst and that later on successive additions of the alkaline material may be added for the purpose of resolubilizing the phenol-aldehyde condensation product, all as herein specifically disclosed. However, when the alkaline catalyst is not used, the time for producing the initial condensation product of the aldehyde and the phenol is very substantially increased and, therefore, commercially the initial reaction between the aldehyde and the phenol will be effected in the presence of an alkaline catalyst.

The total amount of alkaline catalyst used in carrying out the process, that is, the initial alkaline material utilized for catalyzing the reaction between the phenol and the aldehyde and the successive additions of alkaline material used for resolubilizing the alkaline salt of the phenol-aldehyde condensation product may vary between about 4% and about 85 to 90% taken on the weight of the phenol, although certain specific effects are attained by limiting the total alkaline material as herein set forth or by limiting the total alkaline material as herein set forth in conjunction with the limitation as to the molar ratio of the formaldehyde to the phenol as herein set forth.

It is desired to point out that the addition of alkaline material as, for example, sodium hydroxide or any equivalent materials, in small quantities while progressing the reaction is helpful in curbing side reactions, such as the Cannizzaro reaction.

The resins produced in accordance with Examples 9 to 16 inclusive are characterized by the following properties: (a) one gram thereof on a solid basis dissolved in a mixture of 80 ml. of water and 120 ml. of isopropyl alcohol shows no precipitation when there is slowly added to the resulting solution 200 ml. glacial acetic acid; (b) the resin precipitates when one part of resin is dissolved in four parts of acetone; (c) it takes the acid precipitated resin from six to ten times longer to completely dissolve in ethanol than a second resin produced by boiling 100 gms. of phenol, ½ gm. sodium hydroxide and 90 gms. of a 37% commercial formaldehyde solution until the liquid separates into two layers, thereafter cooling to 25° C. and adding a 4% solution of sodium hydroxide.

Referring to subdivision C, the resins produced in accordance with Examples 9 to 16 and the second resin as set forth in subdivision C were both precipitated from the irrespective alkaline solutions by adding a pH reducing agent which reduced the pH below the neutral point, preferably to between 4.5 and 5. Any acid may be used as the pH reducing agent, or any agent may be used generating an acid ion functioning to reduce the pH below the neutral point. For example, 1 to 4 hydrochloric acid may be used. The acid precipitated resins are washed with distilled water and are free of alkaline material, as for example sodium ions when a sodium compound is being used before being tested for ethanol insolubility.

The resins produced in accordance with Examples 1 to 8 inclusive are water soluble, but show a precipitate on the addition of ethanol to an aqueous solution of the resin.

It has been discovered that all of the resins set forth in the above examples are characterized by the property that when precipitated by an acid the resins are insoluble in the aqueous acid solution. It has been further ascertained that this prevents the resin from penetrating into the interior of the cellulose fibers. In this manner substantially the entire amount of the herein phenol-aldehyde resinous condensation product is available to bind the cellulose fibers together. As stated, when the prior art phenol aldehyde resins were incorporated in an aqueous mix in an attempt to produce a softboard, hardboard, paper web, or like material, a very substantial portion of the prior art resins penetrated into the interior of the fiber where they could exert no helpful influence on the binding together of the fibers.

In all of the examples showing the proportion of the phenol-aldehyde condensation product, unless otherwise specified, a technically pure phenol is used. It is to be understood that the phenols may contain more than 15% of at least one phenol selected from the group consisting of orthocresol, orthoxylenol, and mixtures thereof. However, phenols may be used in producing the phenol condensation products in which the phenol does not contain more than 15% of orthocresol, orthoxylenol, or mixtures thereof.

In accordance with the present invention, there is provided a method of bonding a cellulose mass comprising individual cellulose components at a hot-press temperature between about 200° F. and about 300° F. with a thermosetting phenol-aldehyde resin, said process comprising shortening the time it takes to bond the individual components of the cellulose mass to each other by applying to said components a thermosetting phenol-aldehyde reaction product of a phenol selected from the group consisting of monohydric phenols having a distillation range between 175° C. and 225° C., and an alkaline catalyst in an amount accelerating the formation of the initial resin reaction product on heating, the molar ratio of the aldehyde to the phenol varying from 1:1 to 3:1, said resin having been well advanced toward its insoluble, infusible C-stage by the repeated additions of an alkali metal hydroxide with a condensation step in between each addition of alkaline metal hydroxide, said resin having a cure time on a hot plate between one-quarter and one-half the cure time of the phenol-aldehyde resins which are produced otherwise than by repeated additions of an alkaline material, and a condensation step between each addition of alkaline material, and hot-pressing the assembly containing said thermosetting resin at a hot-pressing temperature between about 200° F. and 300° F. As previously pointed out the hot-press period is between about 10% and about 15% less than it takes to hot-press a substantially identical assembly structure under substantially identical operating conditions, said structure which takes a longer time having as its binding medium a phenol-aldehyde resin which is produced by the prior art methods, that is by a method other than the repeated additions of an alkaline material and a condensation step between each addition of alkaline material, there being preferably at least three additions of the alkaline material with two condensation steps.

There has also been provided a method of forming an aqueous slurry of cellulose fibers, said slurry being preferably in an acid state and containing a phenol-aldehyde resin condensation product normally water soluble, but substantially insoluble in the acid slurry, said fibers having because of the insolubility of the phenol-aldehyde resin between 50% and 95% of the resin retained on and in the fibers in an insoluble state. After the formation of said slurry, it is deliquefied, that is dewatered, and thereafter there is formed a dry rigid consolidated mass therefrom, said mass being preferably formed at a temperature between 200° F. and about 300° F. The phenol-aldehyde condensation product of the character above set forth and the cellulose fibers of the slurry constitute preferably between 90 to 95% of the solids of the slurry, although this may vary considerably and still be within the spirit of the present invention, as for example 75%, 80% or 85% of the solids of the slurry may be constituted by the cellulose fibers and by the resin.

There has also been provided a hot and pressure consolidated board of cellulose fibers bonded with between about 0.5% and about 30%, or more narrowly between 0.5% and 3% of the thermosetting phenol aldehyde resin reaction product of the character herein set forth, said resin being well advanced toward its insoluble infusible stage by the repeated additions of an alkaline material with a condensation step in between each addition of alkaline material, said percentages being taken on the dry weight of the cellulose fiber, the resin and the cellulose fibers forming at least preferably 90% of the board constituents: this, however, may vary and may be 75, 80 or 85%. In other words, small proportions of other ingredients will not effect the method or the character of the hot and pressure consolidated board.

There has also been provided a slurry of cellulose fibers containing between 0.5% and 30%, and more narrowly between 0.5% and 15%, or still more narrowly between about 0.5% and 3.5% of a thermosetting phenol-aldehyde resin reaction product of the character herein set forth, said cellulose fibers having the resin retained in and on the surface of the fibers because the resin is insoluble in the acid slurry or in the neutral slurry. Therefore, the resin is available to bond the cellulose fibers together to produce a substantially uniformly bonded product of substantially uniform tensile strength, said resin and cellulose fibers constituting preferably at least 90% of the constituents of the slurry, although said constituents may vary somewhat, as for example 75% to 80% or 85%.

The resins herein set forth may be used in the production of hardboards, softboards and other fiber products utilizing a dry process. In this process the fiber is not dispersed in a wet slurry, but instead, after the fiber is mechanically or chemically separated into individual fibers or small bundles of individual fibers, the latter is mechanically mixed with a solution of the resin in a tumbler kneader or a similar suitable mixing and dispersing apparatus. Employing this process, the resin is not acid precipitated on the fiber, but instead remains in solution. However, because of the low degree of penetration of the herein set forth resins into the fiber, the resin is retained on and surface coats the individual fibers so that when they are bonded together on heat and pressure, a much stronger bond is obtained than when a prior art resin is used. After the resin is uniformly dispersed on the dry fiber, the fiber is removed to a forming frame where it is uniformly distributed by suitable type equipment. Thereafter, the so-treated fiber is transferred to a hot-press where it is subjected to sufficient temperature and pressure to bond the individual fibers together. Usually the temperature and pressure employed in this dry fiber process is much greater than that used in the wet-slurry process.

In utilizing the resins of the present invention in the production of plywood or the production of fiber products such as hardboards, softboards, wallboards and the like, the resin may be mixed with various fillers both reactive and non-reactive such as walnut shell flour, wood flour, fir bark, lignin and the like to improve the product, said fillers resulting in a better dispersion of the resin with the consequent reduction of shrinkage of the product and low water absorption.

The phenol-aldehyde resinous condensation products of the prior art which have been used in cellulose products are characterized by high solubility even in acid solution and because the prior art resins were soluble under those conditions, there was substantially no retention of the resin on the fibers of the cellulose mix from which the final softboard, hardboard or paper web was produced, most of the resin being lost in the white water.

The resins herein set forth are characterized by the property when precipitated by an acid of being insoluble in an aqueous acid solution, and this prevents the resin from penetrating into the interior of the cellulosic fibers. In other words, the resinous phenol-aldehyde condensation product which is very far advanced toward the C-stage, is deposited on the surface of the fiber so that substantially the entire quantity of the resinous condensation product is available to bind the cellulosic fibers together. As stated, when the prior art phenol-aldehyde resins were incorporated in the mix in an attempt to produce a softboard, hardboard or paper web or like material, a very substantial portion of the prior art resin penetrated into the interior of the fiber where it could exert no helpful influence on the binding together of the fibers. The exact amount of resin that will be encrusted upon the fiber as compared with the amount which will penetrate into the interior of the fiber mix will, in general, not only depend upon the character of the resin but on the operating conditions under which the particular board or web is made but, in general, the discovery has been made that the resins herein set forth when precipitated in an acid solution in the manufacture of a paper or wallboard slurry are insolubilized and remain on the surface of the fibers constituting the wallboard mix. In general, it may be stated that at least 85% of the resin that has been added to the cellulosic mix or slurry is retained on the fibers. When attempts were made to use water soluble phenol-aldehyde condensation products of the prior art in the production of softboards, hardboards, paper webs and the like, relatively long pressing periods are required because these resins are not as far advanced toward the insoluble, infusible C-stage as are the resins of the present invention. If the time of pressing to convert the thermosetting resin to the insoluble, infusible C-stage is reduced, then a substantial part of the resin may remain unset and be lost when the product is in actual use.

It is desired to state that in the preparation of the resin utilized in carrying out the present invention that after successive additions of alkaline material, as for example an alkali metal hydroxide, the resin reaches a stage of condensation where it no longer becomes insoluble in an aqueous alkaline solution on further condensation. In other words, the resin becomes permanently soluble in an aqueous alkaline solution, and also permanently soluble in ethanol. Instead of the resin becoming insoluble in the aqueous alkaline solution on further condensation, the viscosity of the resin solution increases. Therefore, the resin that is produced by the repeated addition of an alkaline material and a condensation step between each addition of the alkali, the condensation being carried to the point where the resin becomes insoluble in its aqueous alkaline solution when cooled to 25° C., may not be and usually is not as far advanced to the insoluble, infusible C-stage as those resins produced by adding alkali metal hydroxide in steps and condensing until the viscosity of the resin is increased, the said viscosity being then decreased by additional alkaline material, as set forth in co-pending application, Serial No. 772,016, now Patent No. 2,457,493, granted December 28, 1948, and reissued as Reissue No. 23,347, granted March 20, 1951.

Therefore, in one form of the present invention, after the initial condensation product is produced, as herein set forth, several successive additions of alkaline material are made to the aqueous alkaline resin solution with a condensation step between each alkaline addition. Each time, after the alkaline material, the condensation of the resin is carried forward to the point where the resin becomes insoluble in its aqueous alkaline solution when cooled to 25° C., and this insoluble point is used as the determining point for the addition of more alkaline material to maintain the solubility of the resin, that is to resolubilize the resin in the alkaline solution. In order to further advance the state of the resin towards the insoluble, infusible C-stage, further alkaline material is added in steps to the resin solution to decrease the rising viscosity. When this rising viscosity is decreased, then the resin is again condensed or heat-treated. Condensation will increase the viscosity of the aqueous alkaline solution of the resin and the resin further advanced toward the insoluble, infusible C-stage. This viscosity is again decreased by the addition of alkaline material.

The present application is a continuation-in-part of application Serial No. 772,016, filed September 3, 1947, now Patent No. 2,457,493, reissued as Reissue No. 23,347, said application Serial No. 772,016 being a continuation-in-part of application Serial No. 722,975, filed January 18, 1947, the latter being a continuation-in-part of application Serial No. 510,209, filed November 13, 1943.

The present application is a continuation-inpart of Patent No. 2,457,493 and Reissue Patent No. 23,347, said original patent and reissue patent being a continuation-in-part of application Serial No. 722,975, filed January 18, 1947, the latter being a continuation-in-part of application Serial No. 510,209, filed November 13, 1943, both of said applications now being abandoned.

What I claim is:

1. The method of forming a cellulose fiber product bonded with an insoluble infusible phenol-aldehyde resin comprising forming a mixture of an aqueous acid slurry containing cellulose fibers, and a thermosetting resin-reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said resin being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, said alkali-catalyzed highly condensed phenol-aldehyde resin reaction product being normally water-soluble in alkaline solution but interacting in the presence of said acid slurry to precipitate on said cellulose fibers a substantially insoluble resin, said resin being retained on and in said fibers in an insoluble state, deliquefying the resulting slurry, and heat-converting the deliquefied slurry into a dried rigid consolidated fiber product with said phenol-aldehyde resin converted to its insoluble infusible state and uniformly distributed throughout the interior and on and adjacent surfaces of said consolidated fiber product.

2. The method defined in claim 1 in which the phenol-aldehyde resin is incorporated in the slurry in an amount between the limits of about 0.5% and about 3.5% taken on the dry weight of the cellulose fiber present in the slurry.

3. The method defined in claim 1 in which the deliquefied slurry is heat-converted to a dried rigid consolidated mass at a temperature between the limits of about 200° and about 330° F.

4. The method of forming a cellulose fiber product bonded with an insoluble infusible phenol-aldehyde resin comprising forming a mixture of an aqueous alkaline slurry containing cellulose fibers, and a thermosetting resin-reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said initial resin reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, said alkali-catalyzed highly condensed phenol-aldehyde resin reaction product being soluble in said alkaline slurry, acidifying said alkaline slurry to precipitate out of solution and on said fibers said highly condensed phenol-aldehyde resin, the latter being retained on and in said fibers in an insoluble state and heat-converting the deliquefied slurry into a dried rigid consolidated fiber product with said phenol-aldehyde resin converted to its insoluble infusible state and uniformly distributed throughout the interior and on and adjacent surfaces of said consolidated fiber product.

5. The method of forming a cellulose product bonded with an insoluble infusible phenol-aldehyde resin comprising forming a composite unit comprising cellulose components and a solution of a thermosetting resin-reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said resin reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, said alkali-catalyzed highly condensed phenol-aldehyde resin reaction product being normally water-soluble in alkaline solution, said solution of the resin reaction product being primarily retained on the surface of the cellulose components and coating the same, and hot-pressing the resulting mass of cellulose components until the resin bonding agent is converted to its insoluble infusible state.

6. The heat-and-pressure-consolidated board of cellulose fibers bonded with an infusible water-insoluble thermoset phenol-aldehyde resin recovered from the resin reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said resin reaction product being well advanced toward the insoluble infusible state by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, said alkali-catalyzed condensation product being water soluble, said infusible thermoset resin being substantially uniformly distributed throughout the interior and on and adjacent the surfaces of the board, the latter having a substantially uniform tensile strength, said thermoset resin and bonding material and cellulose fibers forming a majority of the constituents of the board.

7. The heat-and-pressure-consolidated board defined in claim 6 in which the thermoset phenol-aldehyde resin is present between the limits of about 0.5% and about 30%, said percentages being taken on the dry weight of the cellulose fibers.

8. The heat-and-pressure consolidated board defined in claim 7 in which the aldehyde is formaldehyde.

9. The heat-and-pressure-consolidated board defined in claim 6 in which the thermoset phenol-aldehyde resin is present between the limits of about 0.5% and about 3.5%, said percentages being taken on the dry weight of the cellulose fibers.

10. The heat-and-pressure consolidated board defined in claim 9 in which the aldehyde is formaldehyde.

11. The method defined in claim 6, in which the aldehyde is formaldehyde and the alkali metal hydroxide is caustic alkali.

12. The method of producing a cellulose mass comprising individual cellulose components bonded at a hot-press temperature with a highly condensed thermoset phenol-aldehyde resin-reaction product comprising applying to said components a thermosetting phenol-aldehyde reaction product formed by heat-reacting an aqueous mixture of a monohydric phenol having a distillation range between about 175° and 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said resin reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, and hot-pressing the resulting mass of cellulose components carrying said alkali-catalyzed highly condensed resin reaction product at a temperature which converts said resin reaction product into its insoluble infusible state and for a period of time which is between about 10% and about 15% less than it takes to hot-press a substantially identical cellulose structure under substantially identical operating conditions, said cellulose structure having as its binding medium a phenol-aldehyde resin which has been produced otherwise than by said repeated additions of an alkali metal hydroxide and a condensation step between each addition of alkali metal hydroxide.

13. The method of producing a cellulose mass comprising individual cellulose components bonded at a hot-press temperature with a highly condensed thermoset phenol-aldehyde resin-reaction product comprising applying to said components a thermosetting phenol-aldehyde reaction product formed by heat-reacting an aqueous mixture of a monohydric phenol having a distillation range between about 175° and 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said resin reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol, and hot-pressing the resulting mass of cellulose components carrying said alkali-catalyzed highly condensed resin reaction product at a temperature between the limits of about 200° and about 330° F. and for a period of time which is between about 10% and about 15% less than it takes to hot-press a substantially identical cellulose structure under substantially identical operating conditions, said cellulose structure having as its binding medium a phenol-aldehyde resin which has been produced otherwise than by said repeated additions of an alkali metal hydroxide and a condensation step between each addition of alkali metal hydroxide.

14. The method defined in claim 12 in which the aldehyde is formaldehyde.

15. A slurry of cellulose fibers containing distributed thereon between 0.5% and 30% of a water-insoluble thermosetting phenol-aldehyde resin precipitated from an aqueous solution of a thermosetting phenol-aldehyde resin reaction product formed by heat-reacting an aqueous mixture of a phenol selected from the group of monohydric phenols having a distillation range between about 175° and about 225° C., an aldehyde in which the aldehyde radical is the sole reactive group, and an alkaline catalyst in an amount accelerating the formation on heating of an initial resin reaction product, the molar ratio of the aldehyde to the phenol varying from 1:1 to 3:1, said initial resin reaction product being well advanced towards its final insoluble infusible C-stage by the repeated addition thereto of an alkali metal hydroxide with a condensation step in between each addition of alkali metal hydroxide, said additions of alkali metal hydroxide being terminated while the resin reaction product is in a water-soluble stage, said water-soluble reaction product being condensed to a stage where an aqueous solution of the condensed mass shows a precipitate upon the addition of ethanol; said percentages being taken on the dry weight of the cellulose fibers, the latter having the aforesaid precipitated thermosetting phenol-aldehyde resin retained in and on the surfaces of the cellulose fibers where it is available to bond the same together to produce a substantially uniformly bonded product of substantial uniform tensile strength, said substantially water-insoluble resin and cellulose fibers forming a majority of the solid constituents of the slurry.

16. A heat-and-pressure consolidated assembly of cellulose units bonded with an infusible insoluble thermoset phenol-aldehyde resin-reaction product formed by heat-reacting an aqueous mixture of a monohydric phenol having a distillation range between 175° and 225° C., an aldehyde in which the aldehyde radical is the sole reactive group, and an alkaline catalyst in an amount accelerating the formation of the initial resin reaction product, the molar ratio of the aldehyde to the phenol varying from 1:1, to 3:1, said initial resin reaction product being well advanced toward the insoluble infusible C-stage by the repeated addition thereto of an alkali metal hydroxide with a condensation step in between each addition of alkali metal hydroxide, said additions of alkali metal hydroxide being terminated while the resin-reaction product is in a water-soluble stage, said water-soluble reaction product being condensed to a stage where an aqueous solution of the condensed mass shows a precipitate upon the addition of ethanol.

17. The method defined in claim 5 in which the aldehyde is formaldehyde and the alkali metal hydroxide is caustic alkali.

18. The method defined in claim 13 in which the aldehyde is formaldehyde and the alkali metal hydroxide is caustic alkali.

19. The method defined in claim 1 in which the aldehyde is formaldehyde and the alkali metal hydroxide is caustic alkali.

20. The method defined in claim 4 in which the aldehyde is formaldehyde and the alkali metal hydroxide is caustic alkali.

DONALD V. REDFERN.

REFERENCES CITED

The following references are of record in the file of this patent:

UNITED STATES PATENTS

| Number | Name | Date |
|---|---|---|
| Re. 23,347 | Redfern | Mar. 20, 1951 |
| 1,160,362 | Baekeland | Nov. 16, 1915 |
| 1,160,365 | Baekeland | Nov. 16, 1915 |
| 1,776,366 | Novotny | Sept. 23, 1930 |
| 1,885,066 | Warren et al. | Oct. 26, 1932 |
| 2,068,759 | Nevin | Jan. 26, 1937 |
| 2,215,245 | King et al. | Sept. 17, 1940 |
| 2,215,246 | Gill | Sept. 17, 1940 |
| 2,232,718 | Nevin | Feb. 25, 1941 |
| 2,338,602 | Schur | Jan. 4, 1944 |
| 2,360,376 | Van Epps | Oct. 17, 1944 |
| 2,397,323 | Trefz et al. | Mar. 26, 1946 |
| 2,402,469 | Toland et al. | June 18, 1946 |
| 2,409,645 | Sawyer | Oct. 22, 1946 |
| 2,414,414 | Rhodes | Jan. 14, 1947 |
| 2,414,415 | Rhodes | Jan. 14, 1947 |
| 2,476,347 | Allan | July 19, 1949 |
| 2,492,702 | Neubert et al. | Dec. 27, 1949 |
| 2,559,220 | Maxwell et al. | July 3, 1951 |

OTHER REFERENCES

Collins: Paper Industry and Paper World, June 1943, pp. 263–269.